(12) United States Patent
Kim (10) Patent No.: US 8,808,406 B2
(45) Date of Patent: Aug. 19, 2014

(54) METHOD OF MANUFACTURING SECONDARY BATTERY

(75) Inventor: Daekyu Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 507 days.

(21) Appl. No.: 13/244,172

(22) Filed: Sep. 23, 2011

(65) Prior Publication Data

US 2012/0023739 A1    Feb. 2, 2012

Related U.S. Application Data

(62) Division of application No. 12/626,157, filed on Nov. 25, 2009, now Pat. No. 8,062,787.

(60) Provisional application No. 61/241,768, filed on Sep. 11, 2009.

(51) Int. Cl.
*H01M 4/82* (2006.01)

(52) U.S. Cl.
USPC ........................................... 29/623.4

(58) Field of Classification Search
USPC ........................................... 29/623.4
See application file for complete search history.

(56) References Cited

U.S. PATENT DOCUMENTS

| | | | |
|---|---|---|---|
| 4,957,833 A | 9/1990 | Daifuku et al. | |
| 6,743,546 B1 | 6/2004 | Kaneda et al. | |
| 8,048,559 B2 | 11/2011 | Kim | |
| 8,062,787 B2 | 11/2011 | Kim | |
| 2003/0068562 A1 | 4/2003 | Kim et al. | |
| 2003/0148174 A1 | 8/2003 | Gu | |
| 2004/0265702 A1 | 12/2004 | Kim | |
| 2006/0154138 A1 | 7/2006 | Miyamoto et al. | |
| 2006/0172190 A1 | 8/2006 | Kaplin et al. | |
| 2006/0251962 A1 | 11/2006 | Kim | |
| 2007/0119047 A1 | 5/2007 | Gu | |
| 2007/0154787 A1 | 7/2007 | Jang et al. | |

(Continued)

FOREIGN PATENT DOCUMENTS

| | | |
|---|---|---|
| CN | 1992393 A | 7/2006 |
| CN | 101431164 A | 5/2009 |

(Continued)

OTHER PUBLICATIONS

Japanese Office Action dated Nov. 13, 2012 for Japanese Patent Application No. JP 2010-196562 which shares priority of U.S. Appl. No. 61/241,768, filed Sep. 11, 2009.

(Continued)

*Primary Examiner* — Karie O'Neill Apicella
(74) *Attorney, Agent, or Firm* — Knobbe, Martens, Olson & Bear, LLP (57) ABSTRACT

A secondary battery and a method of manufacturing the same are disclosed. In one embodiment, the secondary battery includes an electrode assembly including an external surface, an electrolyte, a sealing tape including an adhesive layer attached to at least portion of an outer surface of the electrode assembly and contacting the external surface of the electrode assembly and a base sheet disposed on an adhesive layer and formed of a material having directionality, and a can receiving the electrode assembly, the electrolyte, and the sealing tape, wherein the base sheet loses directionality and is shrunk and deformed in shape by contact with the electrolyte, and at least portion of the base sheet contacts an inner surface of the can to prevent the electrode assembly from being freely moved within the can.

14 Claims, 6 Drawing Sheets

(56) References Cited

U.S. PATENT DOCUMENTS

| | | |
|---|---|---|
| 2008/0102354 A1 | 5/2008 | Lee |
| 2008/0152997 A1 | 6/2008 | Lee |
| 2008/0233474 A1 | 9/2008 | Son et al. |
| 2009/0117459 A1 | 5/2009 | Hyung et al. |
| 2009/0297929 A1 | 12/2009 | Uchida |
| 2010/0080018 A1 | 4/2010 | Overes |

FOREIGN PATENT DOCUMENTS

| | | |
|---|---|---|
| DE | 43 27 293 A1 | 3/1994 |
| EP | 1 717 879 A1 | 11/2006 |
| EP | 1 804 320 A2 | 7/2007 |
| EP | 2 019 442 A1 | 1/2009 |
| GB | 1 385 910 | 3/1975 |
| JP | 06-150971 A | 5/1994 |
| JP | 10-302751 A | 11/1998 |
| JP | 2000-133220 A | 5/2000 |
| JP | 2001-273933 A | 10/2001 |
| JP | 2003-151634 A | 5/2003 |
| JP | 2004-228078 A | 8/2004 |
| JP | 2008-019311 A | 1/2008 |
| JP | 2010-511987 A | 4/2010 |
| KR | 10-2003-0066959 A | 8/2003 |
| KR | 10-2007-0025722 A | 3/2007 |
| KR | 10-0719725 B1 | 5/2007 |
| KR | 10-2007-0096649 A | 10/2007 |
| KR | 10-2008-0057977 A | 6/2008 |
| KR | 10-2009-0007074 A | 1/2009 |

OTHER PUBLICATIONS

European Search Report dated Aug. 18, 2010 for EP Application No. 0 925 2269.7, corresponding to U.S. Appl. No. 12/554,528, filed Sep. 4, 2009.

Office Action dated Feb. 15, 2011 for U.S. Appl. No. 12/554,504, filed Sep. 4, 2009.

Notice of Allowance dated Jul. 5, 2011 for U.S. Appl. No. 12/554,504, filed Sep. 4, 2009.

Korean Office Action dated Oct. 13, 2011 for Korean Patent Application No. KR 10-2009-0119812 corresponding to U.S. Appl. No. 12/554,528, filed Sep. 4, 2009.

European Search Report dated Dec. 13, 2011 for European Patent Application No. EP 11 250 367.7 corresponding to U.S. Appl. No. 13/033,970, filed Feb. 24, 2011.

Ophardt, Charles E., "Rubber Polymers", *Virtual Chembook*, Elmhurst College, 2003, pp. 1-2.

European Search Report dated Sep. 10, 2010 for European Patent Application No. EP 10 25 1224.1 which corresponds to U.S. Appl. No. 12/831,975, filed Jul. 7, 2010.

Office Action dated Feb. 7, 2012 for U.S. Appl. No. 12/554,528, filed Sep. 4, 2009.

Korean Office Action dated Aug. 25, 2011 for Korean Patent Application No. KR 10-2010-0047292 which corresponds to U.S. Appl. No. 12/831,975, filed Jul. 7, 2010.

Office Action dated Apr. 18, 2012 for U.S. Appl. No. 12/831,975, filed Jul. 7, 2010.

Chinese Office Action dated Jul. 18, 2013 for Chinese Patent Application No. CN 201010221253.3, which shares priority of Korean Patent Application No. KR 10-2010-0047292 with U.S. Appl. No. 12/831,975, filed Jul. 7, 2010.

Chinese Office Action dated Sep. 18, 2013 for Chinese Patent Application No. CN 201110217262.X which claims priority from U.S. Appl. No. 61/371,118, filed May 8, 2010, and U.S. Appl. No. 13/033,970.

Korean Notice of Allowance dated Jan. 19, 2002 for Korean Patent Application No. KR 10-2010-0011079 corresponding to U.S. Appl. No. 12/626,157, filed Nov. 25, 2009, now U.S. Patent No. 8,062,787, Issued Nov. 22, 2011.

Office Action dated Oct. 25, 2012 for U.S. Appl. No. 12/831,975, filed Jul. 7, 2010.

Notice of Allowance dated Jun. 7, 2012 for U.S. Appl. No. 12/554,528, filed Sep. 4, 2009.

METHOD OF MANUFACTURING SECONDARY BATTERY

RELATED APPLICATIONS

This application claims priority to and is a divisional of U.S. application Ser. No. 12/626,157, filed Nov. 25, 2009, which claimed priority to and the benefit of Provisional Patent Application No. 61/241,768 filed on Sep. 11, 2009 in the U.S. Patent and Trademark Office, the entire contents of which are incorporated herein by reference.

This application also relates to U.S. patent application Ser. Nos. 12/554,528 and 12/554,504, both filed on Sep. 4, 2009, both of which are incorporated herein by reference in their entirety.

BACKGROUND

1. Field

Embodiments relate to a secondary battery and a method of manufacturing the same.

2. Description of the Related Technology

Generally, an electrode assembly together with an electrolyte is received into a can to form a secondary battery. The electrode assembly includes a positive electrode plate, a negative electrode plate, and a separator disposed between the positive and negative electrode plates.

SUMMARY

One aspect is a secondary battery configured to prevent an electrode assembly from being freely moved in a can and a method of manufacturing the same.

Another aspect is a secondary battery including: an electrode assembly including an external surface; an electrolyte; a sealing tape including an adhesive layer attached to at least portion of an outer surface of the electrode assembly and contacting the external surface of the electrode assembly and a base sheet disposed on an adhesive layer and formed of a material having directionality; and a can receiving the electrode assembly, the electrolyte, and the sealing tape, wherein the base sheet loses directionality and is shrunk and deformed in shape by contact with the electrolyte, and at least portion of the base sheet contacts an inner surface of the can.

The base sheet may include a first region in which a thickness of at least portion of the base sheet increases and a second region in which a thickness of at least portion of the base sheet decreases when the base sheet is shrunk by contacting the electrolyte, and the base sheet contact the inner surface of the can in the first region in which a thickness of at least portion of the base sheet increases.

The base sheet may include a thermal shrinkage film under a temperature of about 30° C. or more. The shrinkage of the base sheet may be about 40% or more, and particularly, range from about 40% to about 64%. In the base sheet 51, shrinkage in a transverse direction (TD) may be greater than that in a machine direction (MD). The base sheet may have a thickness of about 20 um to 60 um. The base sheet may have a thickness of about 20 um to 300 um in the first region. The base sheet may be shrunk and deformed by contacting the electrolyte and is separated from the adhesive layer.

The base sheet may be formed of oriented polystyrene (Hereinafter, referred to as a shrinkable OPS) having a shrinkage characteristic. The electrolyte may include a non-aqueous organic solvent which is configured to remove the directionality of the base layer. The non-aqueous organic solvent may include a carbonate based non-polar organic solvent. The carbonate based non-polar organic solvent may include one of dimethyl carbonate (DMC) electrolyte, diethyl carbonate (DEC) and dipropyl carbonate (DPC). The sealing tape may be wound around a quarter or more of the outer surface of the electrode assembly including the finishing part.

Another aspect is a method of manufacturing a secondary battery, the method including: preparing an electrode assembly including an external surface, a sealing tape including an adhesive layer attached to at least portion of an outer surface of the electrode assembly and contacting an external surface of the electrode assembly and a base sheet disposed on the adhesive layer and formed of a material having directionality, and a can receiving the electrode assembly and the sealing tape; attaching the sealing tape to at least portion of the electrode assembly to insert the electrode assembly and the sealing tape into the can; and injecting an electrolyte into the can such that the base sheet loses its directionality by contacting an electrolyte and is shrunk and deformed, and at least portion of the base sheet contacts an inner surface of the can.

After the injection process is performed, the method of manufacturing the secondary battery may further include at least one of a formation process and an aging process. The aging process may be performed by exposing the assembled battery to an environment having a temperature from about 50° C. to about 70° C. for about 18 hours to about 36 hours. The base sheet may be shrunk and deformed by contacting the electrolyte and be separated from the adhesive layer, and after the aging process is performed, the adhesive layer may have an adhesion force ranging from about 2 kgf/cm$^2$ to about 9 kgf/cm$^2$.

Another aspect is a secondary battery, comprising: an electrode assembly comprising an outer surface; an electrolyte; a sealing tape attached to and surrounding at least part of the outer surface of the electrode assembly, wherein the sealing tape comprises i) an adhesive layer contacting the outer surface of the electrode assembly and ii) a base layer formed on the adhesive layer, and wherein the base layer is formed of a material which has directionality; and a can accommodating the electrode assembly and sealing tape, wherein the base layer, upon contacting the electrolyte, is configured to at least partially lose directionality and partially shrink so that at least a portion partially increases thickness.

In the above battery, the adhesive layer, upon contacting the electrolyte, is configured to not substantially deform so as to maintain the adhesive property thereof. In the above battery, the adhesive layer has an adhesion force ranging from about 2 kgf/cm$^2$ to about 9 kgf/cm$^2$.

In the above battery, at least a portion of the base layer is thicker than at least a different portion of the base layer, and wherein the thicker portion of the base layer contacts an inner surface of the can. In the above battery, the electrolyte comprise at least one of the following: dimethyl carbonate (DMC), diethyl carbonate (DEC), dipropyl carbonate (DPC), methylpropylcarbonate (MPC), ethylpropyl carbonate (EPC), methylethyl carbonate (MEC), ethylene carbonate (EC), propylene carbonate (PC), and butylene carbonate (BC).

In the above battery, the base layer has a thickness in the range of about 20 μm to about 60 μm. In the above battery, the thickness of the adhesive layer is in the range of about 1 μm to about 30 μm. In the above battery, the adhesive layer comprises an acryl-based adhesive material, and wherein the acryl-based adhesive material comprises at least one of the following: poly methyl methacrylate (PMMA), poly ethyl methacrylate (PEMA), and poly butyl methacrylate (PBMA).

Another aspect is a secondary battery, comprising: an electrode assembly comprising an outer surface; an electrolyte; a sealing tape attached to and surrounding at least part of the outer surface of the electrode assembly, wherein the sealing tape comprises i) an adhesive layer contacting the outer surface of the electrode assembly and ii) a base layer formed on the adhesive layer; and a can accommodating the electrode assembly and sealing tape, wherein the base layer comprises first and second regions, wherein the first region is thicker than the second region, and wherein the first region contacts an inner surface of the can.

In the above battery, the thickness of the first region of the base layer is in the range of about 20 μm to about 300 μm. In the above battery, the base layer comprises at least one of the following: polystyrene (PS), polyamide, polyacrylonitrile, polyvinyl alcohol, polycarbonate, polyethylene vinyl acetate, and oriented polystyrene (OPS). In the above battery, the adhesive layer, upon contacting the electrolyte, is configured to not substantially deform so as to maintain the adhesive property thereof. In the above battery, the adhesive layer has an adhesion force ranging from about 2 $kgf/cm^2$ to about 9 $kgf/cm^2$.

Another aspect is a method of manufacturing a secondary battery, comprising: providing 1) an electrode assembly comprising an outer surface, 2) a sealing tape attached to and surrounding at least part of the outer surface of the electrode assembly, wherein the sealing tape comprises i) an adhesive layer contacting the outer surface of the electrode assembly and ii) a base layer formed on the adhesive layer, wherein the base layer is formed of a material which has directionality and wherein the base layer comprises first and second regions, and 3) a can configured to receive the electrode assembly and sealing tape; placing the electrode assembly and the sealing tape into the can so as to form an assembled secondary battery; and subjecting the base layer to contact electrolyte, wherein the base layer at least partially loses directionality and partially shrink so that the first region is thicker than the second region and contacts an inner surface of the can.

In the above method, the shrinkage of the base layer in an axial direction is greater than that in a winding direction, and wherein the axial direction is substantially perpendicular to the winding direction. In the above method, the shrinkage of the base layer is about 40% or more with respect to the base layer before contacting the electrolyte. In the above method, the shrinkage of the base layer is in the range of about 40% to about 64% with respect to the base layer before contacting the electrolyte. In the above method, the shrinkage of the base layer in a axial direction is in the range of about 50% to about 70%, and wherein the shrinkage of the base layer in a winding direction is in the range of about 0% to about 5%. In the above method, the base layer has a thermal shrinkage characteristic under a temperature of about 30° C. In the above method, the electrolyte comprise at least one of the following: dimethyl carbonate (DMC), diethyl carbonate (DEC), dipropyl carbonate (DPC), methylpropylcarbonate (MPC), ethylpropyl carbonate (EPC), methylethyl carbonate (MEC), ethylene carbonate (EC), propylene carbonate (PC), and butylene carbonate (BC).

In the above method, the base layer comprises a shrinkable oriented polystyrene (OPS) film. In the above method, the shrinkable OPS film is manufactured using an elongation process. In the above method, the shrinkable OPS film has a shrinkage of about 40% or more. In the above method, a longitudinal elongation of the OPS film is over about 45% and a transverse elongation of the OPS film is over about 210%.

The above method further comprises performing at least one of a formation process and an aging process. In the above method, the aging process is performed by exposing the assembled battery to an environment having a temperature from about 50° C. to about 70° C. for about 18 hours to about 36 hours. In the above method, the adhesive layer, upon contacting the electrolyte, does not substantially deform so as to maintain the adhesive property thereof, and wherein the adhesive layer has an adhesion force ranging from about 2 $kgf/cm^2$ to about 9 $kgf/cm^2$.

DETAILED DESCRIPTION

Secondary batteries may be classified into a cylinder type secondary battery and a prismatic type secondary battery. In the cylinder type secondary battery, a cylindrical electrode assembly is received into a cylindrical can. The cylindrical electrode assembly received into the cylindrical can may be easily rotated or slipped relative to the cylindrical can due to external vibrations or impacts. Such relative movement may increase the internal resistance of the secondary battery and damage electrode tabs of the electrode assembly, and thus it is desirable to prevent the electrode assembly from being rotated or slipped relative to the cylindrical can.

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Referring to FIGS. 1 to 6, a secondary battery 5 according to an embodiment includes a can 10, an electrode assembly 20, a lower insulating member 30, an upper insulating member 40, a sealing tape 50, an electrolyte, and a cap assembly 100.

The can 10 may have a cylindrical shape and be formed of a light conductive metal such as aluminum or an aluminum alloy. In another embodiment, the secondary battery 5 may be other type secondary battery. For example, the cross-section of the secondary battery has a polygonal shape. For convenience, a cylinder type secondary battery will be described.

Figure 3:
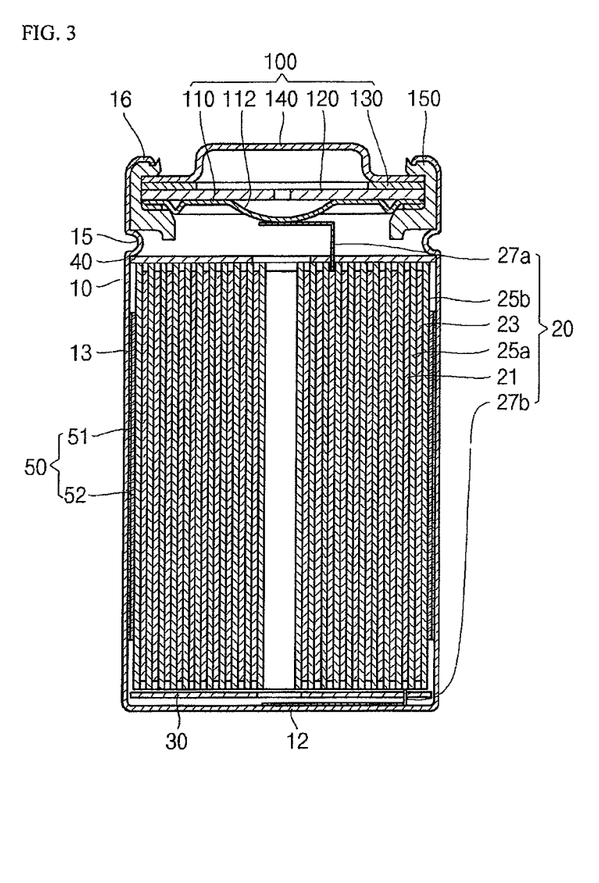
FIG. 3 illustrates a longitudinal sectional view of the secondary battery of FIG. 1.
Figure 4:
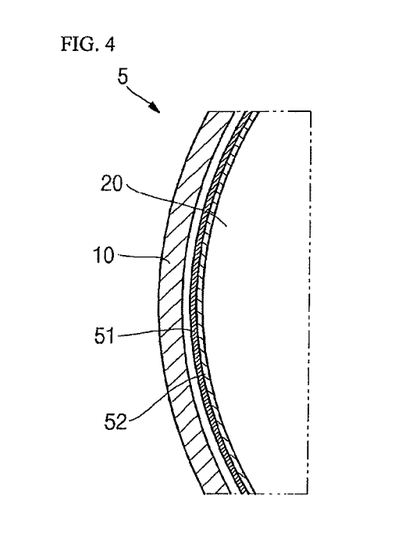
FIG. 4 illustrates a partially schematic cross-sectional view of the secondary battery of FIG. 1 before an electrolyte is injected into the secondary battery.
Figure 5:
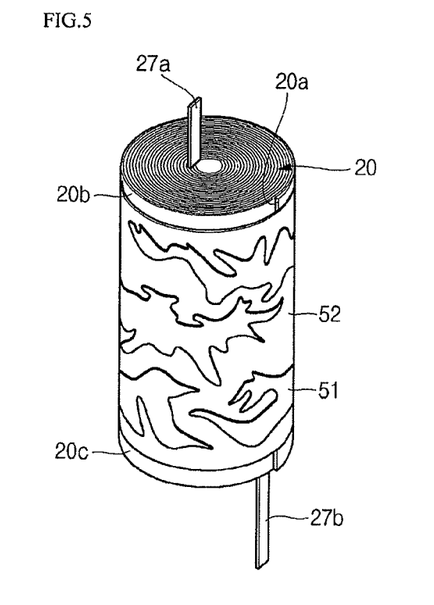
FIG. 5 illustrates a schematic perspective view of an electrode assembly of FIG. 1 after an electrolyte is injected into the secondary battery.
Figure 6:
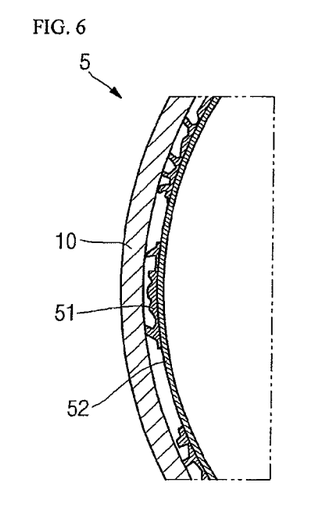
FIG. 6 illustrates a longitudinal sectional view of the secondary battery after an electrolyte is injected into the secondary battery.

The can 10 may be manufactured using a machining process such as deep drawing. In one embodiment, the can 10 has a cylindrical shape and is formed of a light conductive metal such as aluminum or an aluminum alloy. The can 10 may have a different shape depending on the shape of the electrode assembly 20. For convenience, a cylindrical can will be described. Referring to FIG. 3, the can 10 includes a circular bottom plate 12 and a cylindrical sidewall 13 extending from an edge of the circular bottom plate 12. A beading part 15 protruding inwardly along the periphery of the can 10 is formed on an upper portion of the sidewall 13. The beading part 15 prevents the lower insulating member 30, the electrode assembly 20, and the upper insulating member 40 from being moved from the inside of the can 10 toward a direction substantially perpendicular to the bottom plate 12. A crimping part 16 is disposed on a top end of the sidewall 13. The crimping part 16 provides sealing between the can 10 and the cap assembly 100. An opening 10a is defined in a top portion of the sidewall 13 so that the lower insulating member 30, the electrode assembly 20, the upper insulating member 40, and the cap assembly 100 are sequentially inserted into the can 10 through the opening 10a.

The electrode assembly 20 includes a first electrode plate 21, a second electrode plate 23, a first separator 25a, and a second separator 25b. The electrode assembly 20 further includes a first electrode tab 27a and a second electrode tab 27b. In one embodiment, the first electrode plate 21, the first separator 25a, the second electrode plate 23, and the second separator 25b are sequentially stacked, and then, cylindrically wound to form the electrode assembly 20.

In this embodiment, the first electrode plate 21 includes a positive electrode plate, and the second electrode plate 23 includes a negative electrode plate. In another embodiment, the second electrode plate 23 may be a positive electrode plate and the first electrode plate 21 may be a negative electrode plate.

In one embodiment, although not shown in detail, the first electrode plate 21 includes a positive electrode collector and a positive electrode coating portion. The positive electrode collector may be formed of a conductive metal to collect electrons from the positive electrode coating portion and deliver the electrons to an external circuit. The positive electrode coating portion may be formed of at least one of a positive electrode active material, a conductive material, and a binder. The positive electrode coating portion may be coated on the positive electrode collector. First non-coating portions on which the positive electrode coating portion is not coated may be disposed on both ends of a winding direction of the first electrode plate 21. In one embodiment, the first electrode tab (positive electrode tab) 27a is coupled to one of the first non-coating portions using a method such as welding. The first electrode tab 27a extends from the inside of the can 10 toward the opening 10a.

In one embodiment, although not shown in detail, the second electrode plate 23 includes a negative electrode collector and a positive electrode coating portion. The negative electrode collector may be formed of a conductive metal to collect electrons from the negative electrode coating portion and deliver the electrons to an external circuit. The negative electrode coating portion may be formed of at least one of a negative electrode active material, a conductive material, and a binder. The negative electrode coating portion may be coated on the negative electrode collector. Second non-coating portions on which the negative electrode coating portion is not coated may be disposed on both ends of a winding direction of the second electrode plate 23. In one embodiment, the second electrode tab (negative electrode tab) 27b is coupled to one of the first non-coating portions using a method such as welding. The first electrode tab 27a extends from the inside of the can 10 toward the bottom plate 12. In one embodiment, the second electrode tab 27b is coupled to the bottom plate 12 of the can 12 using a method such as welding. In this embodiment, the can 10 has a negative polarity, and the bottom plate 12 of the can 10 is used as a negative terminal of the secondary battery 5.

The first and second separators 25a and 25b allow the first and second electrode plates 21 and 23 to be separated from each other. Fine pores may be formed in the first and second separators 25a and 25b. As a result, lithium ions moving between the first and second electrode plates 21 and 23 may pass through the fine pores. Each of the first and second separators 25a and 25b may be formed of a polymer resin such as polyethylene (PE) and polypropylene (PP).

The lower insulating member 30 may have an approximate disk shape to provide insulation between the electrode assembly 20 and the bottom plate 12 of the can 10. The upper insulating member 40 may have an approximate disk shape to provide insulation between the electrode assembly 20 and the beading part 15 of the can 10.

In one embodiment, the sealing tape 50 is attached to at least portion of an outer surface of the electrode assembly 20. In one embodiment, the sealing tape 50 includes an adhesive layer 52 contacting an outer surface of the electrode assembly 20 and a base sheet (or base layer) 51 disposed on the adhesive layer 52 and formed of a material having directionality.

The sealing tape 50 is attached to the outer surface of the wound electrode assembly 20 to prevent the electrode assembly 20 from being unwound, by the use of a finishing part 20a formed on the outer surface thereof. In one embodiment, the outermost end of the second separator 25b is placed at the finishing part 20a. The sealing tape 50 may be attached to the electrode assembly 20 in a manner such that the sealing tape 50 is wound around the outer surface of the electrode assembly 20 including the finishing part 20a. Therefore, it may prevent the electrode assembly 20 from being unwound.

The sealing tape 50 may be wound once around the outer surface of the electrode assembly 20 when the sealing tape 50 is attached to the outer surface of the electrode assembly 20. The sealing tape 50 may be wound multiple times around the outer surface of the electrode assembly 20. Alternatively, the sealing tape 50 may be wound around only a portion of the electrode assembly 20 in the circumferential direction of the electrode assembly 20. For effectively preventing movement of the electrode assembly 20 relative to the can 10, the sealing tape 50 may be wound one or more times around the outer surface of the electrode assembly 20.

The sealing tape 50 is disposed between the outer surface of the electrode assembly 20 and the inner surface of the can 10. Here, a surface of the sealing tape 50 facing the inner surface of the can 10 may have low frictional resistance such that the electrode assembly 20 is easily inserted into the can 10.

The base sheet 51 may be a polymer film that loses its directionality by contacting the electrolyte, and thus, the base sheet 51 may be shrunk and varied in shape. In one embodiment, when the polymer film contacts the electrolyte, a non-aqueous organic solvent of the electrolyte is permeated between molecules of the polymer film, and thus, the directionality of the polymer film, which is formed during the fabrication process of the polymer film, may be lost, and the polymer film is shrunk. Here, the directionality of the polymer film may be generated by, for example, uniaxial drawing, biaxial drawing, and compression, which is applied during a film manufacturing process using a resin.

In one embodiment, the base sheet, upon contacting the electrolyte, may partially shrink and partially expand. For example, the base sheet 51 may include a first region in which a thickness of at least portion of the base sheet 51 increases and a second region in which a thickness of at least portion of the base sheet 51 decreases when the base sheet 51 is shrunk by contacting the electrolyte. The first region in which the thickness of the base sheet 51 increases may contact an inner surface of the can 10. Thus, when the first region in which the thickness of the base sheet 51 increases contacts the inner surface of the can 10, a frictional force is generated to prevent the electrode assembly 20 from being freely moved.

Shrinkage of the base sheet 51 caused by an aging process of the secondary battery (hereinafter, simply referred to as a "shrinkage") may be about 40% or more, and particularly, range from about 40% to about 64%. The shrinkage is a resultant value measured after the base sheet 51 is left in a thermostat bath containing the non-aqueous organic solvent that loses the directionality of the base sheet 51 at about 60° C. for about 24 hours. The non-aqueous organic solvent will be described later. The above range (about 40% or more) may effectively and/or efficiently prevent movement of the electrode assembly 20. However, depending on the embodiments, the shrinkage of the base sheet 51 may be less than about 40%.

Here, in the shrinkage of the base sheet 51, shrinkage in a transverse direction (TD) or axial direction may be greater than that in a machine direction (MD) or a winding direction. In one embodiment, the shrinkage in the MD may approach almost zero.

In order to obtain the base sheet 51 having shrinkage of about 40% to about 64%, a thermal shrinkage of the base sheet 51 in the TD may range from about 70% to about 50%, and a thermal shrinkage of the base sheet 51 in the MD may range from about 0% to about 5%, but are not limited thereto. Here, the thermal shrinkage is a resultant value measured after a film constituting the base sheet 51 is left in the thermostat bath at about 90° C. for about 10 seconds.

Since the base sheet 51 may be variably modified according to standard types of battery, the base sheet 51 may have a thickness ranging from about 20 μm to about 60 μm, but is not limited thereto. The above range (about 20 μm to about 60 μm) may effectively and/or efficiently prevent movement of the electrode assembly 20. However, depending on the embodiments, the base sheet 51 may have a thickness less than about 20 μm or greater than about 60 μm.

As above-described, the base sheet 51 loses its directionality, and thus is shrunk and deformed when the base sheet 51 contacts the electrolyte. Due to such deformation, the first region in which the film increases in thickness is formed. In the first region in which the film increases in thickness, the film may have a thickness ranging from about 20 um to about 300 um. When the thickness of the film is within the above range in the first region, the movement preventing effect of the electrode assembly may be maximized.

The base sheet 51 may be formed of any polymer film as long as the polymer film may lose its directionality formed during a fabrication process (such as uniaxial drawing, biaxial drawing, or compression), and thus be shrunk and deformed in shape by contact with electrolyte. The base sheet 51 may include at least one of the following: a polystyrene (PS) film, a polyamide film, a polyacrylonitrile film, a polyvinyl alcohol film, a polycarbonate film, a polyethylene vinyl acetate film, and an oriented polystyrene (OPS) film, which may be easily penetrated by the non-aqueous organic solvent of electrolyte because of its relatively large intermolecular distance.

Among the above-described films, a film having a thermal shrinkage characteristic under a temperature of about 50° C. or more may be used as the base sheet 51. When the film having the thermal shrinkage characteristic is used, the base sheet 51 may be significantly changed in thickness due to the thermal shrinkage in the aging process of typical processes of manufacturing the secondary battery 5. Thus, the base sheet 51 may further firmly contact the inner surface of the can 10 in the first region in which the thickness of the base sheet 51 increases to efficiently prevent the electrode assembly 20 from being freely moved.

A shrinkable OPS film may be used as the base sheet 51. In this embodiment, an OPS film represents a general OPS film manufactured using an injection molding process. The shrinkable OPS film represents an OPS film manufactured using an elongation process. A shrinkable OPS film having shrinkage of about 40% or more has relatively high elongation. According to an embodiment, when a longitudinal elongation is over about 45%, and a transverse elongation is over about 210%, a shrinkable OPS film having shrinkage of about 40% or more may be obtained. The shrinkable OPS film having shrinkage within the above range may have a very uniform thickness when compared to the general OPS film manufactured using the injection molding process. Also, in the shrinkable OPS film having shrinkage within the above range, a foreign substance (a foreign substance of the OPS film used for this embodiment represents a gel) is reduced in thickness when compared to the general OPS film manufactured using the injection molding process. This is done because a gel thickness is conserved into a raw condition as it is in the OPS film manufactured using the injection molding process, but a gel thickness is reduced due to the elongation process in the OPS film manufactured using the elongation process.

In one embodiment, the adhesive layer 52 is coated on the base sheet 51 and contacts the finishing part 20a formed on the outer surface of the wound electrode assembly 20. The adhesive layer 52 may be formed of any adhesive material that is generally used for a sealing tape 50 in the related art and may not react with the electrolyte. For example, the adhesive layer 52 may be formed by coating the base sheet 51 with an acryl-based adhesive. The acryl-based adhesive may be an adhesive selected from the group consisting of poly methyl methacrylate (PMMA), poly ethyl methacrylate (PEMA), and poly butyl methacrylate (PBMA).

The adhesive layer 52 may be coated on the base sheet 51 using various currently available coating methods, and the thickness of the adhesive layer 52 may be varied. For example, the adhesive layer 52 may be coated to a thickness of about 1 μm to about 30 μm by coating the base sheet 51 with an adhesive through a knife coating process. However, the base sheet 51 may be coated to a different thickness using another coating method.

Figure 1:
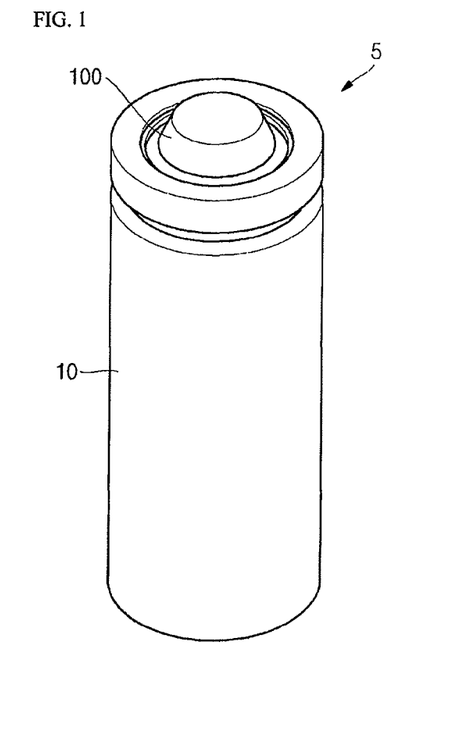
FIG. 1 illustrates a perspective view of a secondary battery according to an embodiment.
Figure 2:
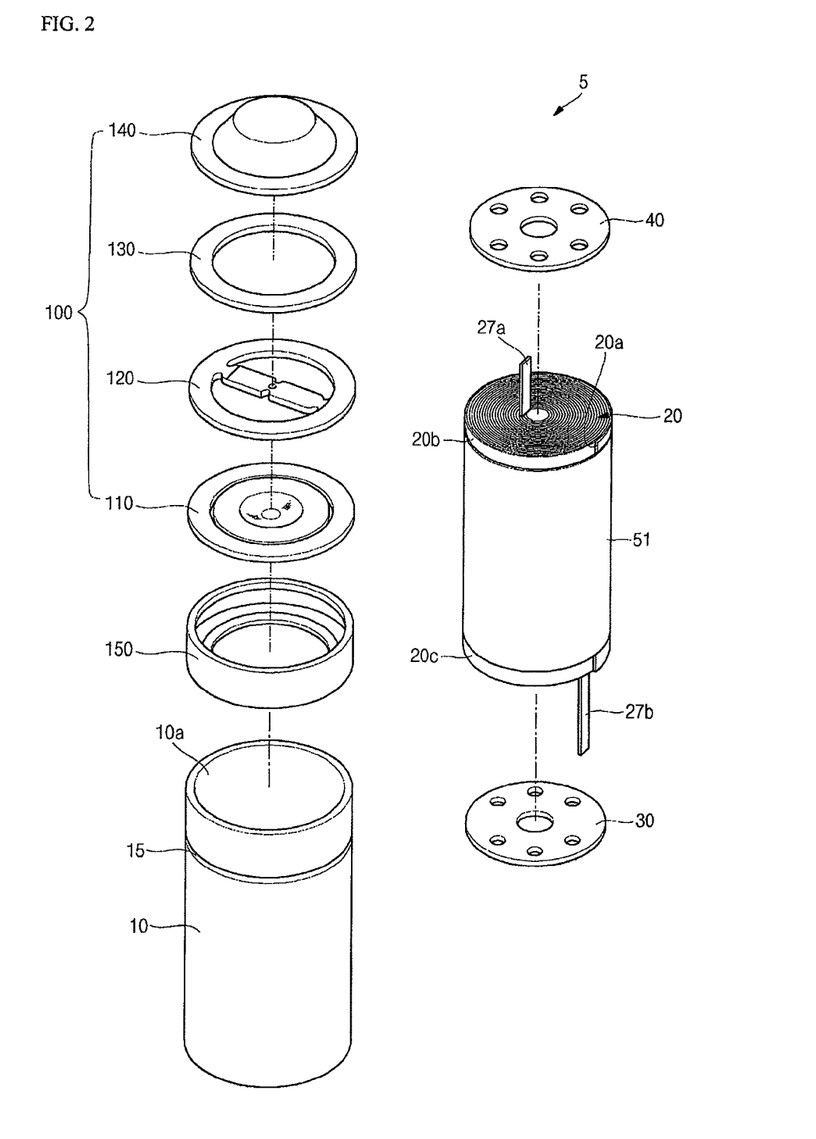
FIG. 2 illustrates an exploded perspective view of the secondary battery of FIG. 1.

The sealing tape 50 may be attached to the electrode assembly 20 in a manner such that the entire width of the electrode assembly 20 is enclosed by the sealing tape 50. Alternatively, the sealing tape 50 may be attached to the electrode assembly 20 except for an upper end part 20b and a lower end part 20c of the outer surface of the electrode assembly 20 as shown in FIG. 2. An electrolyte may be permeated between the can 10 and the electrode assembly 20 through the upper end part 20b, and the electrolyte injected into a bottom of the can 10 may contact the electrode assembly 20 at the lower end part 20c. Therefore, when immersion of the electrode assembly 20 in the electrolyte is considered, the sealing tape 50 may not be attached to the upper end part 20b and the lower end part 20c. In this embodiment, the width of the sealing tape 50 is not limited to a specific value. However, the width of the sealing tape 50 may be equal to or greater than about 20% of the width of the electrode assembly 20. The above range (equal to or greater than about 20%) may effectively and/or efficiently prevent movement of the electrode assembly 20. However, depending on the embodiments, the width of the sealing tape 50 may be less than about 20% of the width of the electrode assembly 20. The sealing tape 50 may further sequentially include an auxiliary adhesive layer and an auxiliary base sheet (not shown) between the base sheet 51 and the adhesive layer 52. Here, the base sheet 51 loses its directionality by contacting the electrolyte and is shrunk. Thus, at least a portion of the base sheet 51 contacts the inner surface of the can 10, and the auxiliary adhesive layer is disposed below the base sheet 51. Also, the adhesive layer 52 contacts the outer surface of the electrode assembly 20, and the auxiliary base sheet is disposed between the adhesive layer 52 and the auxiliary adhesive layer. As described above, when the auxiliary adhesive layer and the auxiliary base sheet are further provided, it may more efficiently prevent the electrode assembly from being released by deformation due to the shrinkage of the base sheet 51. Here, an olefin-based film used for a general sealing tape may be used as the auxiliary base sheet, and an adhesive having the same material as that of the adhesive layer 52 may be used as the auxiliary adhesive layer.

Any electrolyte may be used as long as the electrolyte includes a non-aqueous organic solvent by which the base sheet 51 may be shrunk, and the directionality of a polymer film may be released. For example, the non-aqueous organic solvent may include carbonates. Examples of such carbonates include dimethyl carbonate (DMC), diethyl carbonate (DEC), dipropyl carbonate (DPC), methylpropylcarbonate (MPC), ethylpropyl carbonate (EPC), methylethyl carbonate (MEC), ethylene carbonate (EC), propylene carbonate (PC), and butylene carbonate (BC). The non-aqueous organic solvent may include a carbonate-based non-polar organic solvent. For example, the carbonate based non-polar organic solvent may include at least one of dimethyl carbonate (DMC), diethyl carbonate (DEC), and dipropyl carbonate (DPC). Such a carbonate based non-polar organic solvent may be easily permeated between molecules of a polymer such as polystyrene (PS) having a relatively large intermolecular distance, so that the directionality of the polymer can be easily released. The carbonate based non-polar organic solvent of the non-aqueous organic solvent, i.e., at least one of the DMC, DEC, and DPC may include about 10% to about 60% by weight of the total contents of the electrolyte. The above range (about 10% to about 60%) may effectively and/or efficiently prevent movement of the electrode assembly 20. However, depending on the embodiments, the electrolyte may include less than about 10% or more than about 60% by weight of the total contents of the electrolyte.

Other commercially available electrolytes except for the organic solvent may be used as the electrolyte according to an embodiment. That is, the non-aqueous organic solvent, specifically, the carbonate based non-polar organic solvent, specifically, any electrolyte including the DMC, the DEC, or the DPC may be used as the electrolyte according to an embodiment.

The cap assembly 100 is disposed between the crimping part 16 and the beading part 15. The cap assembly 100 includes a safety vent 110, a current interrupt device (CID) 120, a positive temperature coefficient (PTC) device 130, and a cap-up 140 that are disposed in this order away from the electrode assembly 20.

The safety vent 110 electrically connects the first electrode tab 27a and the CID 120. The safety vent 110 includes a protrusion 112 at a central portion thereof. The protrusion 112 may be convex toward the electrode assembly 20 and electrically connected to the first electrode tab 27a. When the inside pressure of the secondary battery 5 exceeds a reference pressure, the protrusion 112 may be reversed. The CID 120 electrically connects the safety vent 110 and the PTC device 130. When the protrusion 112 is reversed due to an increased inside pressure of the secondary battery 5, the CID 120 may be broken so that the safety vent 110 and the PTC device 130 may be electrically disconnected.

The electric resistance of the PTC device 130 may increase steeply as the surrounding temperature increases. The PTC device 130 electrically connects the CID 120 and the cap-up 140. When the temperature of the secondary battery 5 increases excessively, the electric resistance of the PTC device 130 may increase greatly to interrupt the current flow.

In one embodiment, the cap-up 140 is electrically connected to the PTC device 130 and exposed to the outside of the secondary battery 5. The cap-up 140 may be used as a positive terminal of the secondary battery 5.

The cap assembly 100 is insulated from the can 10 by an insulating gasket 150. The insulating gasket 150 is disposed around the circumference of the cap assembly 100 and fixed to the inside of the can 10 by the beading part 15 and the crimping part 16.

The structure of the cap assembly shown in the drawings is an exemplary structure provided for describing an embodiment. The structure of the cap assembly 100 can be variously changed. It will be apparent to those of ordinary skill in the art that the structure of the cap assembly shown in the drawings may be changed or modified without departing from the spirit and scope of the present invention.

Figure 7:
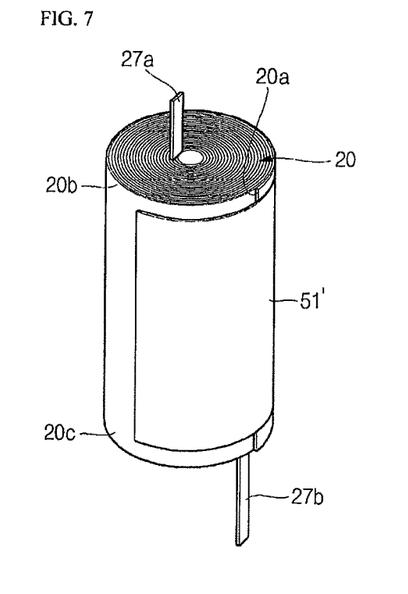
FIG. 7 illustrates a schematic perspective view of a secondary battery before an electrode assembly contacts an electrolyte according to another embodiment.

FIG. 7 illustrates a schematic perspective view of a secondary battery before an electrode assembly contacts an electrolyte according to another embodiment. Referring to FIG. 7, a secondary battery includes an electrode assembly 20 and a sealing tape 50 including an adhesive layer 52 attached to at least portion of an outer surface of the electrode assembly 20 and contacting an external surface of the electrode assembly 20 and a base sheet 51 disposed on the adhesive layer 52 and formed of a material having directionality. Since the electrode assembly 20 and the sealing tape 50 have the same structure as those of the secondary battery 5 illustrated in FIGS. 1 to 6 except for winding degree of the sealing tape 50a, duplicated descriptions will be omitted. However, only the winding degree of the sealing tape 50a will be described in detail.

The sealing tape 50 is attached to the outer surface of the wound electrode assembly 20 to prevent the electrode assembly 20 from being unwound. That is, the electrode assembly 20 includes a finishing part 20a on the outer surface thereof. The outermost end of the second separator 25b may be placed at the finishing part 20a. The sealing tape 50 is attached to the electrode assembly 20 in a manner such that the sealing tape 50 is wound around the outer surface of the electrode assembly 20 including the finishing part 20a. Therefore, it may prevent the electrode assembly 20 from being unwound.

Here, the sealing tape 50 may be wound to cover only a portion of a longitudinal direction of the outer surface of the electrode assembly 20 including the finishing part 20a on the outer surface of the electrode assembly 20. When considering the movement of the electrode assembly 20, the sealing tape 50 may be wound around about a quarter or more of the outer surface of the electrode assembly 20 including the finishing part 20a on the outer surface of the electrode assembly 20. The above range (about a quarter or more) may effectively and/or efficiently prevent movement of the electrode assembly 20. However, depending on the embodiments, the sealing tape 50 may be wound around about a quarter or less of the outer surface of the electrode assembly 20.

A method of manufacturing a secondary battery will now be described with reference to FIGS. 1 to 6. A method of manufacturing a secondary battery 5 includes a preparation process, an assembly process, and an injection process. Depending on the embodiments, additional processes may be added, others removed, or the order of the processes changes.

In the preparation process, an electrode assembly 20, a sealing tape 50, and a can 10 are prepared. The electrode assembly 20 includes an external surface. The sealing tape 50 includes an adhesive layer 52 attached to at least portion of an outer surface of the electrode assembly 20 and contacting an external surface of the electrode assembly 20 and a base sheet 51 disposed on the adhesive layer 52 and formed of a material having directionality. The can 10 receives the electrode assembly 20 and the sealing tape 50. Since the components used in the preparation process are previously described above, their detailed descriptions will be omitted.

In the assembly process, the sealing tape 50 is attached to at least portion of the electrode assembly 20, and then, the electrode assembly 20 and the sealing tape 50 are inserted into the can 10. The sealing tape 50 is disposed between the outer surface of the electrode assembly 20 and the inner surface of a can 10. In the assembly process, the electrode assembly 20 to which the sealing tape 50 is attached is inserted in the can 10, and other components of a secondary battery 5 are assembled.

In detail, a lower insulating member 30, the electrode assembly 20 to which the sealing tape is attached, and an upper insulating member 40 are sequentially arranged from a lower side. In this state, a second electrode tab 27b of the electrode assembly 20 is coupled to a bottom plate 12 of the can 10 by a method such as welding. At this time, a beading part and a crimping part are not yet formed at the can 10. Next, the lower insulating member 30, the electrode assembly 20 to which the sealing tape 50 is attached, and the upper insulating member 40 are sequentially inserted into the can 10 through an opening 10a of the can 10. Thereafter, a beading part 15 is formed at a sidewall 13 of the can 10 so that the lower insulating member 30, the electrode assembly 20 to which the sealing tape 50 is attached, and the upper insulating member 40 may be stably held in the can 10 without movement substantially perpendicular to the bottom plate 12.

In the injection process, the base sheet 51 loses its directionality by contacting an electrolyte, and thus is shrunk and deformed. The electrolyte is injected into the can 10 such that at least portion of the base sheet 51 contacts an inner surface of the can 10. The electrolyte allows lithium ions generated by an electrochemical reaction in electrodes 25a and 25b when charged and discharged to be movable.

When the electrolyte is injected, the electrolyte contacts the base sheet 51 of the sealing tape 50 attached to the outer surface of the electrode assembly 20. At this time, a non-aqueous organic solvent of the electrolyte is penetrated between molecules due to the contact between the base sheet 51 and the electrolyte to lose the directionality applied to the base sheet 51 during a film fabrication process.

When the directionality is lost, the base sheet 51 is shrunk to form a first region in which at least portion of the base sheet 51 increases in thickness and a second region in which at least portion of the base sheet 51 decreases in thickness. The base sheet 51 contacts the inner surface of the can 10 in the first region in which at least portion of the base sheet 51 increases in thickness to prevent the electrode assembly 20 from being freely moved inside the can 10.

A finishing assembly process may be performed after the electrolyte is injected. An insulating gasket 150 is inserted through the opening 10a and placed on the beading part 15. Thereafter, a cap assembly 100 is placed inside the insulating gasket 150. Then, a crimping part 16 is formed on the upper end of the sidewall 13 so as to fix the insulating gasket 150 and the cap assembly 100. After the secondary battery 5 is assembled in this way, a post-treatment operation such as a formation operation and an aging operation may be performed.

In the formation operation, the assembled secondary battery 5 may be repeatedly charged and discharged so as to activate the secondary battery 5. When the secondary battery 5 is charged, lithium ions moves from a lithium metal oxide used as a positive electrode to a carbon electrode used as a negative electrode. At this time, since lithium is highly reactive, the lithium ions react with the negative carbon electrode to produce reaction products such as Li2, CO3, LiO, and LiOH which form a film called solid electrolyte interface (SEI) on the surface of the carbon electrode.

In the aging operation, the secondary battery 5 may be allowed to sit for a predetermined time so as to stabilize the SEI film. For example, in the aging operation, the secondary battery 5 may be allowed to sit for about 18 hours to about 36 hours at about 50° C. to about 70° C.

At this time, when the base sheet 51 having a thermal shrinkage characteristic is used, the base sheet 51 is left at a high temperature for a long time during the aging process. Thus, thermal shrinkage is additionally progressed to sufficiently shrink the base sheet 51 of the sealing tape 50. Due to the thermal shrinkage, the base sheet 51 of the sealing tape 50 is sufficiently deformed to form locally thicker parts, and thus movement of the electrode assembly 20 relative to the can 10 may be effectively prevented by the locally thicker parts of the base sheet 51.

The base sheet 51 is shrunk and deformed by contacting the electrolyte, and thus is separated from the adhesive layer 52. This is done because the base sheet 51 may be substantially significantly deformed to exert adhesion (detachable) characteristics of an adhesive, thereby being separated from the adhesive layer 52. Thus, the adhesive layer 52 is maintained in a state in which the adhesive layer 52 is attached to the electrode assembly 20. According to this embodiment, after the aging process is performed, the adhesive layer 52 has an adhesion force ranging from about 2 kgf/cm$^2$ to about 9 kgf/cm$^2$. When an adhesion force of the adhesive layer 52 remains after the aging process is performed, it may prevent the electrode assembly 20 from being released.

The adhesion force is obtained by measuring a force at a time point at which upper and lower ends of the secondary battery 5 are cut, and a push-pull gauge is disposed on the lower end of the secondary battery 5, and then, the push-pull gauge is pushed upwardly to move the electrode assembly 20.

Hereinafter, certain examples according to exemplary embodiments will be described. However, the present disclosure is not limited to such examples.

Example 1

LiCoO2 used as a positive electrode active material, polyvinylidene fluoride (PVDF) used as a binder, and carbon used as a conductive material were mixed at a weight ratio of 92:4:4, and the mixture was dispersed in N-methyl-2-pyrrolidone so as to form a positive electrode slurry. The positive electrode slurry was coated with an aluminum foil having a thickness of about 20 μm and was dried and rolled to form a positive electrode.

Artificial graphite used as a negative electrode active material, styrene-butadiene rubber used as a binder, and carboxymethylcellulose used as a thickener were mixed at a weight ratio of 96:2:2, and the mixture was dispersed in water so as to form a negative electrode slurry. A copper foil having a thickness of about 15 μm was coated with the negative electrode slurry and was dried and rolled to form a negative electrode.

A polyethylene/polypropylene porous film (Hoest Cellanese, U.S.) having a thickness of 20 μm was used as a separator. The separator was placed between the cathode and the anode. Then, the separator, the cathode, and the anode were wound, and a sealing tape was wound around them to manufacture an electrode assembly.

A 35 μm (±0.03 μm) thickness shrinkable polystyrene (OPS) film (elongation: TD 45%, MD 210%, shrinkage: 52%, thermal shrinkage: TD 66%, MD 5%) coated with a 15 μm thickness poly methyl methacrylate (PMMA) adhesive was used as the sealing tape.

The electrode assembly wound by a jelly-roll method was inserted in a cylindrical aluminum battery case, and non-aqueous electrolyte was injected into the case. Then, the case was sealed. In this way, a secondary battery was fabricated.

Here, a mixture organic solvent of ethylene carbonate (EC), dimethyl carbonate (DMC), propylene carbonate (PC), and fluorobenzene (FB) (volumetric ratio of EC:DMC:PC:FB was 30:55:5:10), in which 1.1 M of $LiPF_6$ was dissolved, was used as the non-aqueous electrolyte.

Although specific type of materials (electrolyte, base layer, adhesive layer, etc.) or parameters (thickness, width, shrinkage percentage, etc.) were used in the above example 1, it is expected that substantially the same or similar benefits are obtained from other type of materials or parameters discussed in connection with FIGS. 1-9. The same applies to other examples discussed below.

Comparison Example 1

Comparison Example 1 was performed using the same method as Example 1 except that the PP film coated with the 15 μm thickness PMMA adhesive was used as the sealing tape.

Comparison Example 2

The 35 μm OPS film coated with the 15 μm thickness PMMA adhesive was used as the sealing tape.

Experimental Example 1

Measurement of Movement

Movement of a secondary battery manufactured in Example 1 and Comparison Example 1 was measured using a drum test method, and the results were shown in Table 1 and Table 2. A long diameter of the electrode assembly of Example 1 was 17.03, and a long diameter of Comparison Example 1 was 17.19. Here, 18 secondary battery samples were respectively used for measuring the long diameters in Example 1 and Comparison Example 1.

In the drum test method, the secondary battery was disposed within a drum, and a vibration (66 RPM) was applied. At this time, a change of an internal resistance (IR) of the secondary battery per unit time was measured. If an increase of the IR exceeds 110% when compared to an initial IR, it was determined to be inconsistent. The more time it takes to obtain a determination of defectiveness from the drum test, the internal movement of the secondary battery was reduced. The movement preventing effect was confirmed through the drum test results.

TABLE 1

| | | Initial time | 100 min | | 120 min | | 140 min | | 160 min | |
|---|---|---|---|---|---|---|---|---|---|---|
| | | IR | IR | increase | IR | increase | IR | increase | IR | increase |
| Example 1 | 1 | 12.0 | 12.5 | 104% | 12.3 | 103% | 12.3 | 103% | 0.0 | — |
| | 2 | 11.9 | 12.6 | 106% | 12.2 | 103% | 12.6 | 106% | 0.0 | — |
| | 3 | 12.2 | 12.6 | 103% | 12.3 | 101% | 12.4 | 102% | 0.0 | — |
| | 4 | 11.9 | 12.3 | 103% | 12.3 | 103% | 12.1 | 102% | 0.0 | — |
| | 5 | 11.9 | 12.3 | 103% | 12.2 | 103% | 12.3 | 103% | 0.0 | — |
| | 6 | 11.9 | 12.3 | 103% | 12.3 | 103% | 12.3 | 103% | 0.0 | — |
| | 7 | 12.3 | 13.5 | 110% | 12.7 | 103% | 13.1 | 107% | 0.0 | — |
| | 8 | 12.3 | 12.9 | 105% | 12.8 | 104% | 12.8 | 104% | 0.0 | — |
| | 9 | 12.3 | 13.0 | 106% | 12.8 | 104% | 12.9 | 105% | 0.0 | — |
| | 10 | 12.3 | 12.8 | 104% | 12.8 | 104% | 12.8 | 104% | 0.0 | — |
| | 11 | 12.0 | 12.8 | 107% | 12.5 | 104% | 12.8 | 107% | 0.0 | — |
| | 12 | 11.9 | 12.5 | 105% | 12.4 | 104% | 12.1 | 102% | 0.0 | — |
| | 13 | 12.3 | 12.8 | 104% | 12.7 | 103% | 13.0 | 106% | 0.0 | — |
| | 14 | 12.0 | 12.8 | 107% | 12.3 | 103% | 12.5 | 104% | 0.0 | — |
| | 15 | 12.3 | 12.8 | 104% | 13.0 | 106% | 12.4 | 101% | 0.0 | — |
| | 16 | 12.0 | 12.8 | 107% | 12.4 | 103% | 12.8 | 107% | 0.0 | — |
| | 17 | 12.0 | 12.7 | 106% | 12.8 | 107% | 12.5 | 104% | 0.0 | — |
| | 18 | 12.0 | 12.6 | 105% | 12.3 | 103% | 12.7 | 106% | 0.0 | — |

TABLE 2

| | | Initial time | 60 min | | 80 min | | 100 min | |
|---|---|---|---|---|---|---|---|---|
| | | IR | IR | increase | IR | increase (%) | IR | increase |
| Com- | 1 | 16.2 | 17.3 | 107% | 0.0 | — | — | — |
| parison | 2 | 16.2 | 16.8 | 104% | 0.0 | — | — | — |
| Example 1 | 3 | 16.6 | 17.6 | 106% | 17.3 | 104% | 17.1 | 103% |
| | 4 | 16.3 | 17.3 | 106% | 17.3 | 106% | 17.3 | 106% |
| | 5 | 16.0 | 16.8 | 105% | 0.0 | — | — | — |
| | 6 | 16.0 | 16.7 | 104% | 16.7 | 104% | 0.0 | — |
| | 7 | 15.7 | 16.8 | 107% | 16.9 | 108% | 17.2 | 110% |
| | 8 | 15.5 | 16.2 | 105% | 16.4 | 106% | 0.0 | — |
| | 9 | 15.6 | 16.5 | 106% | 0.0 | — | — | — |
| | 10 | 15.4 | 16.3 | 106% | 16.3 | 106% | 0.0 | — |
| | 11 | 15.4 | 16.6 | 108% | 16.7 | 108% | 0.0 | — |
| | 12 | 15.3 | 16.3 | 107% | 16.3 | 107% | 16.8 | 110% |
| | 13 | 15.1 | 0.0 | — | — | — | — | — |
| | 14 | 15.7 | 16.5 | 105% | 0.0 | — | — | — |
| | 15 | 15.8 | 16.1 | 102% | 0.0 | — | — | — |
| | 16 | 15.6 | 16.2 | 104% | 0.0 | — | — | — |
| | 17 | 15.6 | 16.1 | 103% | 0.0 | — | — | — |
| | 18 | 15.4 | 16.2 | 105% | 0.0 | — | — | — |

As shown in Table 1 and Table 2, in the case of Comparison Example 1 to which the PP film is applied, according to the drum test, defectiveness occurs at about 60 min. However, in the case of Example 1 to which the shrinkable OPS film is applied, it can be observed that the drum test passed at about 140 min. Thus, it can be observed that the secondary battery to which the shrinkable OPS film according to the embodiments is applied has a significantly improved movement preventing effect when compared to Comparison Example 1 to which the existing general film is applied.

Experimental Example 2

Measurement of Thickness Uniformity

To confirm thickness uniformity of the shrinkable OPS film of Example 1 and the OPS film of Comparison Example 2, thicknesses were measured at a certain position to obtain standard deviation, and the results were shown in Table 3. For reference, the thickness of the OPS film of Comparison Example 2 was measured using two textile samples.

TABLE 3

| Measurement Number | Comparison Example 2 | | Example 1 |
|---|---|---|---|
| | A: thickness | B: thickness | thickness |
| 1 | 0.028 | 0.033 | 0.040 |
| 2 | 0.031 | 0.03 | 0.038 |
| 3 | 0.029 | 0.027 | 0.039 |
| 4 | 0.027 | 0.028 | 0.039 |
| 5 | 0.026 | 0.029 | 0.039 |
| 6 | 0.029 | 0.026 | 0.041 |
| 7 | 0.027 | 0.029 | 0.039 |
| 8 | 0.026 | 0.028 | 0.039 |
| 9 | 0.026 | 0.025 | 0.040 |
| 10 | 0.029 | 0.033 | 0.040 |
| 11 | 0.03 | 0.026 | 0.040 |
| 12 | 0.03 | 0.027 | 0.040 |
| 13 | 0.028 | 0.031 | 0.040 |
| 14 | 0.026 | 0.03 | 0.041 |
| 15 | 0.025 | 0.026 | 0.039 |
| 16 | 0.029 | 0.028 | 0.039 |
| 17 | 0.027 | 0.03 | 0.039 |
| 18 | 0.027 | 0.025 | 0.038 |
| 19 | 0.031 | 0.026 | 0.040 |
| 20 | 0.031 | 0.025 | 0.040 |
| 21 | 0.029 | 0.032 | 0.041 |
| 22 | 0.03 | 0.031 | 0.038 |
| 23 | 0.028 | 0.028 | 0.038 |
| 24 | 0.026 | 0.026 | 0.039 |
| 25 | 0.027 | 0.028 | 0.039 |
| 26 | 0.028 | 0.025 | 0.039 |
| 27 | 0.026 | 0.027 | 0.040 |
| 28 | 0.028 | 0.028 | 0.041 |
| 29 | 0.028 | 0.026 | 0.040 |
| 30 | 0.03 | 0.031 | 0.040 |
| 31 | 0.031 | 0.028 | 0.041 |
| 32 | 0.031 | 0.028 | 0.042 |
| 33 | 0.029 | 0.03 | 0.042 |
| 34 | 0.026 | 0.031 | 0.041 |
| 35 | 0.025 | 0.025 | 0.040 |
| 36 | 0.028 | 0.027 | 0.039 |
| 37 | 0.027 | 0.028 | 0.039 |
| 38 | 0.026 | 0.026 | 0.040 |
| 39 | 0.03 | 0.025 | 0.040 |
| 40 | 0.031 | 0.026 | 0.039 |
| 41 | 0.028 | 0.031 | 0.040 |
| 42 | 0.03 | 0.03 | 0.041 |
| 43 | 0.029 | 0.028 | 0.041 |
| 44 | 0.028 | 0.028 | 0.040 |
| 45 | 0.026 | 0.027 | 0.038 |
| 46 | 0.029 | 0.026 | 0.039 |
| 47 | 0.027 | 0.028 | 0.039 |
| 48 | 0.028 | 0.029 | 0.038 |
| 49 | 0.028 | 0.026 | 0.038 |
| 50 | 0.031 | 0.03 | 0.039 |
| 51 | 0.031 | 0.027 | 0.040 |
| 52 | 0.031 | 0.027 | 0.041 |
| 53 | 0.027 | 0.029 | 0.040 |
| 54 | 0.027 | 0.029 | 0.040 |
| 55 | 0.026 | 0.026 | 0.041 |
| 56 | 0.027 | 0.028 | 0.040 |
| 57 | 0.028 | 0.03 | 0.040 |
| 58 | 0.027 | 0.025 | 0.040 |
| 59 | 0.031 | 0.027 | 0.038 |
| 60 | 0.031 | 0.025 | 0.039 |
| Average | 0.028 | 0.028 | 0.04 |
| standard deviation | 0.00182 | 0.00213 | 0.00102 |

As shown in Table 3, it can be observed that the shrinkable OPS film has superior thickness uniformity.

Experimental example 3

Confirmation of Foreign Substances

Figure 8:
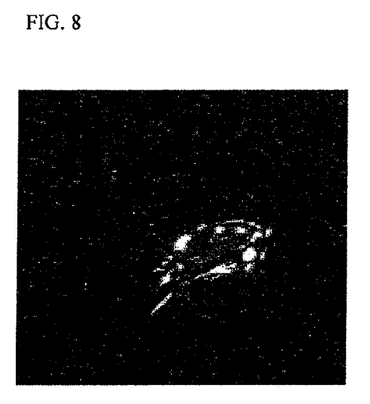
FIG. 8 is a magnified photograph (×30) of an OPS film of Comparative Example 2 according to Experimental Example 3.
Figure 9:
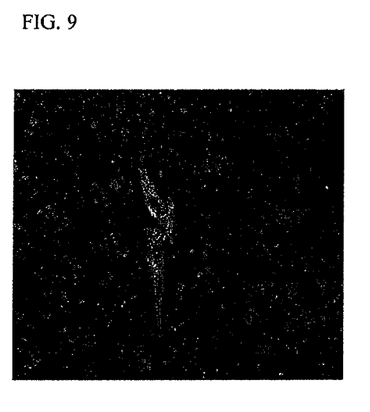
FIG. 9 is a magnified photograph (×30) of an OPS film of Example 1 according to Experimental Example 3.

Magnified photographs (×30) of OPS films of Example 1 and Comparative Example 2 were analyzed, and analysis results are shown in FIG. 8 (OPS film of Comparative Example 2) and FIG. 9 (shrinkable OPS film of Example 1).

As shown in FIGS. 8 and 9, it can be observed that a size of a foreign substance is small in the shrinkable OPS film of Example 1 according to an embodiment. A gel size of the shrinkable OPS film of Example 1 is in the range of 0.5 mm to 1 mm, and a gel size of the shrinkable OPS film of Comparative Example 2 is in the range of 0.5 mm to 15 mm. In particular, measurement results of thicknesses of the foreign substances showed that the gel thickness of the shrinkable OPS film of Example 1 was 4 μm, and the gel thickness of the OPS film of Comparative Example 2 was 45 μm.

Experimental Example 3

Confirmation of Adhesive Force

Adhesive forces of electrode assemblies of secondary batteries in Example 1 and Comparative Example 2 were measured, and results are shown in Table 4. The adhesive forces were measured in such a way that upper and lower parts of the prepared secondary cell were cut, a push-pull gauge was then placed at the lower part, and thereafter a force was measured at the timing when the electrode assembly was shifted by pushing the push-pull gauge in an upper direction.

TABLE 4

| Example 1 | | Comparative Example 2 | |
|---|---|---|---|
| Long Diameter | Adhesive Force (kgf/cm$^2$) | Long Diameter | Adhesive Force (kgf/cm$^2$) |
| 17.09 | 5.0 | 17.20 | 4 |
| 17.08 | 6.0 | 17.05 | 3 |
| 17.07 | 9.0 | 17.04 | 2.8 |
| 17.05 | 7.0 | 17.03 | 1.7 |
| 17.02 | 2.4 | 17.00 | 2.7 |
| 17.00 | 5.3 | | |
| 16.95 | 2.7 | | |

As shown in Table 4 above, it can be confirmed that Example 1 employing the OPS film according to an embodiment is significantly better than the OPS film of Comparative Example 2 even though both of them have similar long diameters (for example, see adhesive forces at the long diameter of 17.05).

According to at least one embodiment, when the base sheet of the sealing tape contacts the electrolyte, the base sheet may lose its directionality, and thus is shrunk and deformed. As a result, a relatively thicker portion generated through the above-described process contacts the inner surface of the can to prevent the electrode assembly from being moved within the can.

According to at least one embodiment, when the base sheet is shrunk, the base sheet is separated from the adhesive layer. At this time, the adhesive layer is maintained in a state in which the adhesive layer is attached to the electrode assembly to provide a certain adhesive force. Thus, although the base sheet of the sealing tape is shrunk, the remaining adhesive layer may provide the certain adhesive force to prevent the electrode assembly from being released.

Exemplary embodiments have been disclosed herein, and although specific terms are employed, they are used and are to be interpreted in a generic and descriptive sense only and not for purpose of limitation. For example, the processing of embodiments may be implemented firmware or in software, e.g., by an article of manufacture having a machine-accessible medium including data that, when accessed by a machine, cause the machine to drive a battery management system. Accordingly, it will be understood by those of ordinary skill in the art that various changes in form and details may be made without departing from the spirit and scope of the present invention as set forth in the following claims.

What is claimed is:

1. A method of manufacturing a secondary battery, comprising:
providing 1) an electrode assembly comprising an outer surface, 2) a sealing tape attached to and surrounding at least part of the outer surface of the electrode assembly, wherein the sealing tape comprises i) an adhesive layer contacting the outer surface of the electrode assembly and ii) a base layer formed on the adhesive layer, wherein the base layer is formed of a material which has directionality and wherein the base layer comprises first and second regions, and 3) a can configured to receive the electrode assembly and sealing tape;
placing the electrode assembly and the sealing tape into the can so as to form an assembled secondary battery; and
subjecting the base layer to contact electrolyte, wherein the base layer at least partially loses directionality and partially shrinks so that the first region is thicker than the second region and contacts an inner surface of the can.

2. The method of claim 1, wherein the shrinkage of the base layer in an axial direction is greater than that in a winding direction, and wherein the axial direction is substantially perpendicular to the winding direction.

3. The method of claim 1, wherein the shrinkage of the base layer is about 40% or more with respect to the base layer before contacting the electrolyte.

4. The method of claim 3, wherein the shrinkage of the base layer is in the range of about 40% to about 64% with respect to the base layer before contacting the electrolyte.

5. The method of claim 3, wherein the shrinkage of the base layer in a axial direction is in the range of about 50% to about 70%, and wherein the shrinkage of the base layer in a winding direction is in the range of about 0% to about 5%.

6. The method of claim 3, wherein the base layer has a thermal shrinkage characteristic under a temperature of about 30° C.

7. The method of claim 3, wherein the electrolyte comprise at least one of the following: dimethyl carbonate (DMC), diethyl carbonate (DEC), dipropyl carbonate (DPC), methylpropylcarbonate (MPC), ethylpropyl carbonate (EPC), methylethyl carbonate (MEC), ethylene carbonate (EC), propylene carbonate (PC), and butylene carbonate (BC).

8. The method of claim 3, wherein the base layer comprises a shrinkable oriented polystyrene (OPS) film.

9. The method of claim 8, wherein the shrinkable OPS film is manufactured using an elongation process.

10. The method of claim 9, wherein the shrinkable OPS film has a shrinkage of about 40% or more.

11. The method of claim 9, wherein a longitudinal elongation of the OPS film is over about 45% and a transverse elongation of the OPS film is over about 210%.

12. The method of claim 1, further comprising performing at least one of a formation process and an aging process.

13. The method of claim 12, wherein the aging process is performed by exposing the assembled battery to an environment having a temperature from about 50° C. to about 70° C. for about 18 hours to about 36 hours.

14. The method of claim 1, wherein the adhesive layer, upon contacting the electrolyte, does not substantially deform so as to maintain the adhesive property thereof, and wherein the adhesive layer has an adhesion force ranging from about 2 kgf/cm$^2$ to about 9 kgf/cm$^2$.

* * * * *